Nov. 26, 1935.  P. S. MORGAN  2,022,141
DIFFERENTIAL GEARING AND POWER TRANSMISSION
Filed Nov. 22, 1933  3 Sheets-Sheet 1

Inventor
Porter S. Morgan
By Albert R. Henry
Attorney

Nov. 26, 1935.  P. S. MORGAN  2,022,141
DIFFERENTIAL GEARING AND POWER TRANSMISSION
Filed Nov. 22, 1933   3 Sheets-Sheet 2

INVENTOR.
Porter S. Morgan
BY Albert R. Henry
ATTORNEYS.

Nov. 26, 1935.  P. S. MORGAN  2,022,141

DIFFERENTIAL GEARING AND POWER TRANSMISSION

Filed Nov. 22, 1933  3 Sheets-Sheet 3

INVENTOR.
Porter S. Morgan
BY Albert R. Henry
ATTORNEYS.

Patented Nov. 26, 1935

2,022,141

UNITED STATES PATENT OFFICE

2,022,141

DIFFERENTIAL GEARING AND POWER TRANSMISSION

Porter S. Morgan, New York, N. Y., assignor of one-tenth to Albert R. Henry, Buffalo, N. Y.

Application November 22, 1933, Serial No. 699,154

8 Claims. (Cl. 74—313)

This invention relates to differential gearing and power transmission, and it has particular reference to a system of power transmission from a main drive shaft to a plurality of driven shafts adapted to rotate at varying speeds and subject to varying resistances wherein power is effectively transmitted to the driven shaft encountering the greater resistance, and the invention also relates to a worm gearing by means of which the stated power transmission and differential action may be obtained in a simple, inexpensive, and efficient manner.

It is frequently desirable to transmit power from a driving member to one or more driven shafts under conditions permitting such shafts to rotate at different speeds at different times. Gearing intended to produce this result is called differential gearing, and, while various forms of gears have been proposed in such systems, the most common form is that employing planetary bevel gears, such as are used in the transmission of power to the rear wheels of an automobile. It is an inherent characteristic of such gearing that the power is not delivered at all times to the driven shafts in proportion to the loads imposed thereon, but rather, it is frequently delivered in inverse ratio thereto. For a common example, reference may be made to the conditions encountered in an automobile when one wheel is free from the ground, or is resting on ice or in mud or other slippery surface. Under these conditions, the power is transmitted to the wheel encountering the less resistance, and there is little, if any, effective power transmitted for the purpose of moving the vehicle.

While this inherent defect in planetary bevel gear differentials has long been recognized, it has heretofore been deemed difficult, if not commercially impractical, to devise a power transmission and differentiating mechanism free from the stated disadvantage. In some proposals, it has been suggested that recourse be had to an irreversible worm or worm wheel as elements of the mechanism, to insure the transmission of power to both driven axles. Such power transmission as may be thus obtained, however, is at the expense of free differentiation, with the result that such worm gears tend to grind against each other under conditions of use, thus leading to mutual self destruction and failure in practice.

Without entering here upon an exhaustive discussion of the mechanics of bevel gear differentials, or those depending upon an arbitrarily cut irreversible worm, it may be said of the first type that good differentiation is obtained at the expense of efficient power transmission, while in the latter case, power transmission is achieved to the extent that free differential movement is sacrificed. These two effects, in mechanisms heretofore proposed as known to me, have thus been opposed to each other, and attempts made to solve the problem by a compromise of properties have resulted in practical failure, both because of the conflict of forces and the great difficulty encountered in making, on a economical basis, physical structures which satisfy the comprise theory.

According to the present invention, it is proposed to provide a worm and worm wheel combination, which, under certain conditions of operation, will act as an ordinary "irreversible" worm gear, thereby permitting the efficient transmission of power, and, under other operating conditions, will act as a "reversible" worm gear, thereby permitting free differential movement. Stating the matter in other words, the invention proposes the selective utilization of a irreversible and a reversible worm, depending upon the need for power transmission or differentiation.

It may be stated here that, in the ordinary form of worm and worm wheel, the helix angle of the worm thread is such that, if the worm is rotated in either direction, a corresponding motion of rotation will be imparted to the worm wheel, but, if an attempt is made to drive the wheel to effect the rotation of the worm, it will be found that the thread and teeth jam against each other, and no rotary motion will result. This effect is referred to as the "irreversibility" of the worm. On the other hand, the helix angle of the worm may be greatly increased so that rotary effort applied to the wheel in either direction will cause a rotary motion of the worm, in which case the worm is said to be "reversible". In the present invention, there is provided a worm and worm wheel, in which the thread and teeth contact with each other in varying relationships under different conditions of operation, with the result that rotary effort applied to the worm in either direction will cause a corresponding rotary motion of the wheel, and rotary effort applied to the wheel in one direction will cause the gearing to behave as irreversible gearing, while rotary effort applied in the opposite direction causes the gearing to act as reversible gearing. This peculiar type of gearing, which is selectively reversible or irreversible, depending upon the direction of rotary motion, I regard as new with me, and as constituting part of the invention irrespective of the application thereof.

In applying the principle of selective reversibility to a power transmission and differential gearing, the parts are so arranged that under normal operating conditions when differentiation is not required, power is transmitted to the driven shafts through an irreversible worm gearing, with the result that the automobile, for example, will be positively driven forward even though one wheel is on ice, or in mud, or is even free from the ground. On the other hand, if the car is turning a corner, so that differential motion is required between the driven wheels, the contact on one side of the car, or to one wheel, is made through a reversible gearing, whereby such wheel may rotate at a different speed than the other. Such differential mechanism I also regard as my invention, whether the same incorporates the specific form of worm and worm wheel hereinafter described, or whether used on an automobile or in other relationship.

From a consideration of the hereinafter described embodiment of the invention, it will be noted that there is further provided various new and improved instrumentalities in gearing, all of which are intended to be made the subject of the appended claims.

Figure 1:
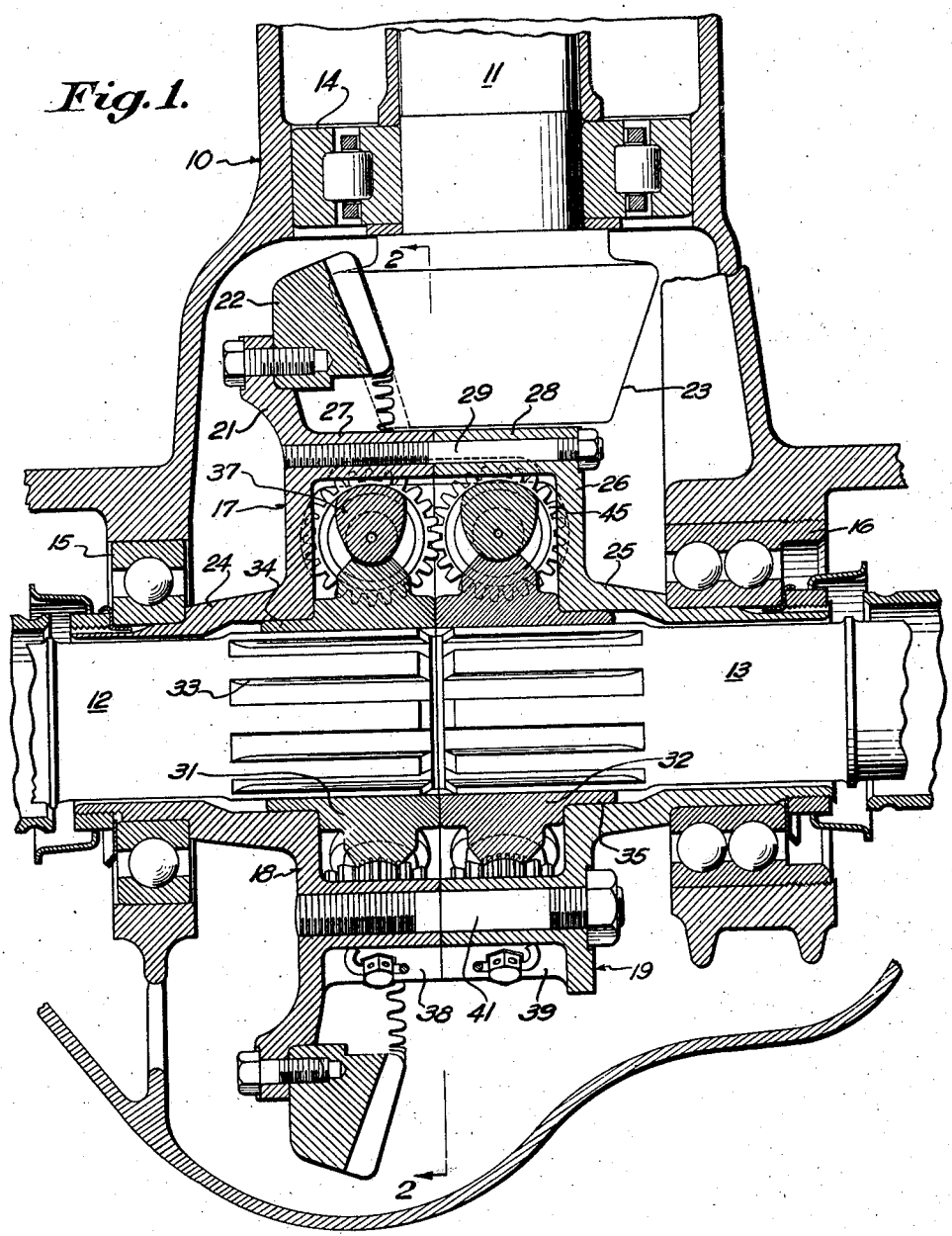
Fig. 1 is a longitudinal section of a differential mechanism for an automobile, the view being taken from the upper side of the vehicle.
Figure 2:
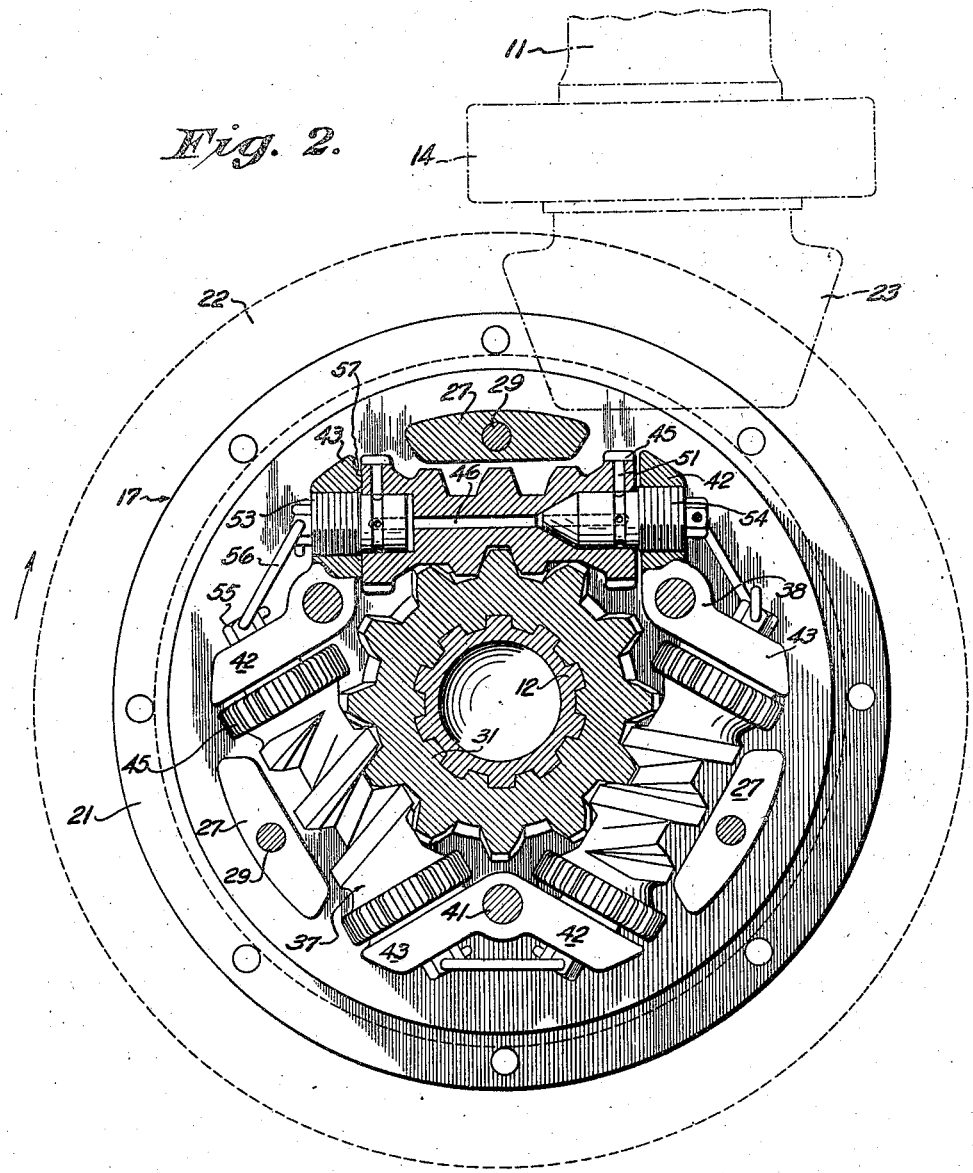
Fig. 2 is a transverse section on the line 2—2 of Fig. 1, or looking to the left driven wheel.

The invention as applied to an automobile differential is shown in Figs. 1 and 2, in which a typical form of rear housing is indicated by the reference numeral 10, into which extend the drive shaft 11 and the left and right rear or driven axles 12 and 13, which carry the driven wheels, not shown. The drive shaft 11 is mounted in the housing 10 by means of a roller bearing 14, while the axles 12 and 13 are supported in part by the ball bearings 15 and 16, through the medium of a carrier 17.

The carrier 17 is formed of two similar sections 18 and 19, the left hand section 18 being formed with a flange 21, to which is secured a ring gear 22, adapted to mesh with a driving pinion 23 secured to the end of the drive shaft 11. The carrier section 18 is also formed with a centrally disposed hub 24 which is rotatably mounted in the bearing 15. The right hand section 19 is likewise formed with a hub 25, rotatably mounted in the bearing 16, and also with a radial portion 26. Both sections 18 and 19 are formed with inwardly extending lugs 27 and 28, respectively, adapted to abut each other, and pierced to receive through bolts 29, for securing the two sections to each other in a unitary assembly. It will thus be seen that, as the drive shaft is rotated, the carrier 17 is rotated in its bearings 15 and 16.

The carrier 17 forms a housing for the ends of the driven axles 12 and 13 which project within the interior thereof. Worm wheels 31 and 32 are mounted on the inner ends of the axles 12 and 13 by means of spline connections 33, and each wheel is formed with a hub portion 34 or 35 adapted to be positioned between the axle and the adjacent portion of the housing 17 to form radial and end thrust bearings, which are brought into play as occasion requires. From a consideration of the operation, as hereinafter set forth, it will be apparent that these bearings need not be elaborate, as under most conditions there is little or no relative rotation between the housing sections 18 and 19 and the hubs 34 and 35.

The driving connection between the rotating carrier 17 and the worm wheels 31 and 32 is provided by a plurality of worms 37, which are mounted on brackets 38 and 39, formed integral with and projecting inwardly from the radial portions of the sections 18 and 19. As best shown in Fig. 2, three brackets are formed on each section, and they are adapted to abut each other and to be secured by means of through bolts 41. Each of the brackets 38 and 39 is formed with angularly related sections 42 and 43, so arranged that adjacent portions of each pair of brackets are parallel to each other, and so spaced as to provide a mounting for the worms. In the specific embodiment herein shown, there are three sets of brackets on each housing section, to provide mountings for three worms, but it will be understood that a greater or less number may be used.

Each of the worms 37 is formed at its ends with a spur gear 45, which is adapted to mesh with the aligned spur gear of the opposed worm, as shown in Fig. 1. Each worm is also formed with an axial bore 46 terminating, at one end, in a cylindrical recess 47, which is also in communication with a radial bore 48, and at the opposite end in a conical recess 49, communicating with a radial bore 51. The various passages are provided to permit the flow of lubricant, the intermeshing spur gears serving as a pump to force lubricant around the bearing recesses 47 and 49.

As best shown in Fig. 2, the opposed bracket portions 42 and 43 are formed with axially aligned and tapped holes which receive the threaded shanks of bearing pins 53 and 54, each of which is formed on its outer end with a perforated head 55, which receives a tie wire 56 extending to a like perforation of an adjoining bearing pin. The tie wires serve to secure the bearing members in a fixed position, after the mechanism has been properly assembled. The sections 42 of the brackets 38 and 39, which are disposed adjacent the cylindrically recessed ends 47 of the worms, are also formed on their inner faces with pads 57, to receive the normal thrust of the worms. The portions of the pins 53, which extend into the recesses 47, therefore serve as radial bearings.

The opposed bearing pins 54 are formed on their inner ends with conical faces adapted to bear against the conical recesses 49 of the worms 37, thereby providing both a radial and a thrust bearing. It will be noted that the inner portions of the bearing pins are also formed with ducts to permit the passage of lubricant at all times. With this construction, the worms 37 are tangentially mounted with respect to the worm wheels 31 and 32, and they may be adjusted axially through the pins 54 to provide uniform bearing contact.

Figure 3:
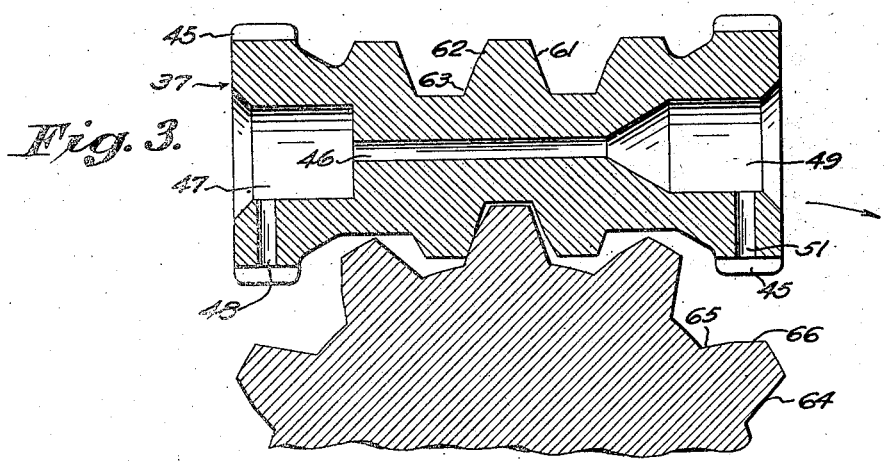
Figs. 3 and 4 are fragmentary sections of a worm and worm wheel on an enlarged scale, showing the contact of the thread and teeth under different conditions of operation, such as forward linear movement and while turning a corner; and, Fig. 5 is a plan view of the worm, with various legends applied thereto to show the nature of the thread.
Figure 4:
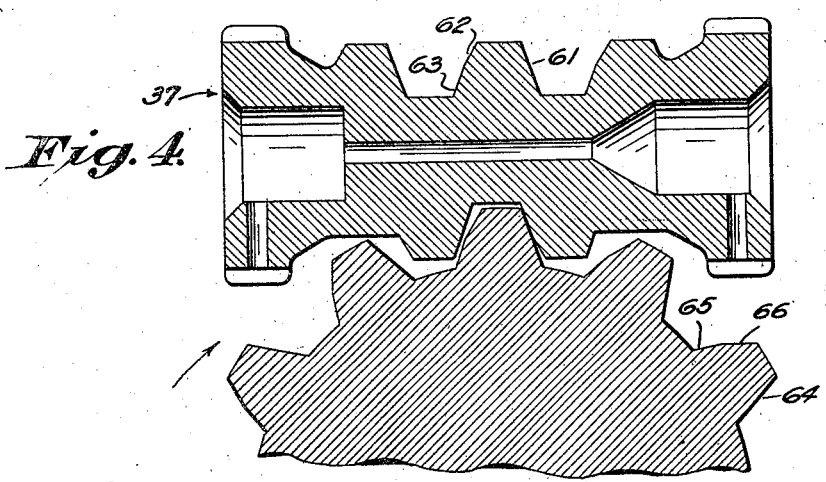
Figure 5:
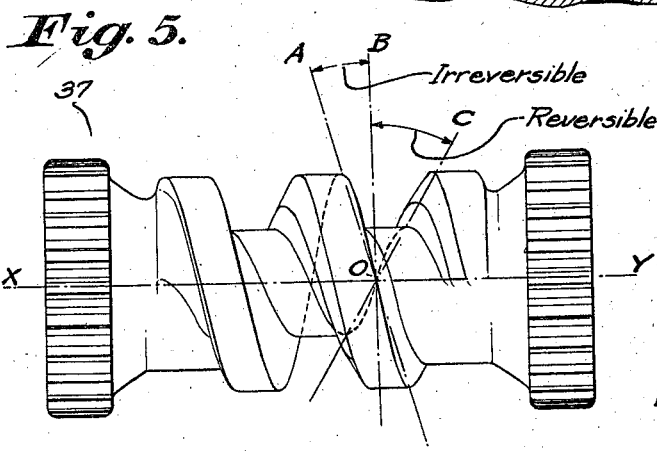

The detailed formation of the thread of the worms 37 is best shown in Figs. 3, 4, and 5, from which it will be noted that the contact between the worm thread and the wheel teeth is such as to produce an irreversible effect under certain conditions, and a reversible effect under other conditions.

Referring first to Fig. 5, it will be observed that the worm is formed with a single thread having a critical relationship between its lead and inner and outer diameters to provide an irreversible helix angle (AOB) on the outer portions of the thread, and a reversible helix angle on the inner or root portions of the thread (BOC). The helix angle AOB is preferably less than 15 degrees, while the root or reversible angle may be between 25 and 30 degrees.

Aside from the helix angle characteristics, as above described, the cross-sectional shape of the worm thread is also changed from the conventional in that one side of the outer or addendum portion of the thread is relieved (or, what is equivalent, the root portion is built up), so that, in section, the worm appears as shown in Figs. 3 and 4. Thus, in Fig. 3 it will be seen that one face of the worm 61 is symmetrical with the root portion 63 of the opposite face of the thread, but is not symmetrical with the opposite addendum portion 62, which is relieved.

The teeth of the worm wheel 31 or 32 are also deformed from the customary involute or other shape, so that, while the tooth on one face 64 is symmetrical at all points with the dedendum portion 65 of the opposite face, it is not symmetrical with the opposed addendum portion 66, which is relieved. It will thus be seen that, when the worm wheel is rotated in one direction, as, for example, counter-clockwise, the teeth of the wheel engage the thread of the worm on the outer portion only of the worm thread, and this drive is accordingly irreversible. When, however, the worm wheel is rotated in a clockwise direction, the wheel teeth engage only the root or reversible portion of the worm, and rotation of the worm can thereby be effected. When the worm is made the driving member, driving contact is obtained either at the addendum or dedendum portions of the wheel teeth, depending upon the direction of rotation, but in both cases, the wheel is constrained to rotate.

Considered from a structural viewpoint, it will be apparent that the principle of selective reversibility embodied in the gearing illustrated may be utilized by relieving both sides of the teeth of the wheel, or both sides of the thread, without deforming the remaining member, but the form disclosed is preferred because of considerations of cost and facility of manufacture with present day gear cutting practice. Likewise, it will be understood that single or multiple thread worms may be used, or a part of the worm may be made fully reversible, with the remaining portion irreversible, for contact with a pair of wheels. These variations, however, while within the purview of the invention, need not be discussed further, as the form illustrated is deemed by me to represent a satisfactory and practical embodiment of the invention.

From a consideration of the nature of the gearing, it will also be apparent that there is provided a ratchet type of mechanism wherein, during motion in one direction of the worm wheel, rotary movement is imparted to the worm, while motion of the wheel in the opposite direction does not produce rotary movement of the worm on its own axis, but necessitates movement of the worm along with the wheel.

Considering the operation of the mechanism shown in Figs. 1 and 2 in conjunction with the foregoing explanation of the gearing, it will now be understood that, as the drive shaft 11 is rotated, the housing 17 is caused to rotate, through the gears 23 and 22. In forward linear driving, and assuming substantially equal loads on the two axles 12 and 13, the clockwise rotation of the housing 17 causes the worms 37 and wheels 31 and 32 to contact in the manner shown in Fig. 3, wherein the addendum or irreversible portion of the worm threads engage the dedendum portions of the gear teeth. Any tendency of the worms to rotate is opposed by the intermeshing of the spur gears 45, and which would, under the conditions assumed, have opposed rotary tendencies when regarded as driving or driven gears. As a net result, the worm wheels 31 and 32 are pulled around with the carrier 17, and the vehicle is therefore driven forward in a positive manner.

If it next be assumed that one of the driven wheels, during such forward movement, encounters sand, mud, ice, or like slippery material, it will be understood that no change is effected in the driving conditions through the gearing. Each wheel is still pulled around at the same rate of speed, and the freeing of either wheel from the pavement, or change in resistance, does not cause the freed wheel to spin ahead of the other wheel, or impede driving through such wheel.

If the car is now driven in reverse, the contact between the threads of the worms and the teeth of the wheels will be changed from the position indicated in Fig. 3 to that shown in Fig. 4. However, positive driving effort is imparted to both wheels, since any tendency of one wheel or the other to move at a different rate than the opposite wheel is offset by the reaction on the opposite wheel through the spur gears 45.

Considering next a movement of the car in a curved path, during which differential movement between the rear axles 12 and 13 is required, it will be understood that the contact between worms and wheel will be as shown in Fig. 3, for one side of the mechanism, and as shown in Fig. 4 for the opposite side. It will be assumed, in this case, that the car is making a left turn, so that the axle 12 represents the axle for the inside wheel and the axle 13 represents the axle for the outside wheel, which must move through a longer radius. The worm wheel 31 is thus driven, the contact being as shown in Fig. 3. The outer worm wheel 32, however, must move through a greater distance, and hence it moves ahead of its worms, taking the position shown in Fig. 4, which is the position for reversible driving through the worm wheel to the worms. The right hand worms may therefore rotate slowly on their axes, thereby causing a counter-clockwise movement of their associated spur gears. Such direction of movement, however, is not opposed to the attempted motion of the spur gears 45 of the left hand worms, which is clockwise, and hence the spur gears 45 of the left hand worms may rotate to any required extent, causing a partial release of the connection between such worms and the left hand worm wheel 31. This motion, in effect, slightly reduces the rate of movement of the inside wheel, but the variations in motion are all proportional, as is required in effective differentiation.

It will thus be understood that the invention provides for a novel form of gearing, in which selective reversibility may be obtained, and that the principle as applied to automobile differential mechanisms provides for a positive drive at all times, and one in which free differentiation may be obtained as occasion requires, without concurrently causing undue wear on the engaging gears. While the invention has been set forth with reference to one specific form of worm and worm wheel, and one particular application thereof, it will be understood that it is not intended thereby to limit the invention, the scope of which should be determined from the import of the following claims.

I claim:

1. A worm and worm wheel gearing comprising a worm having a thread formed thereon, the helix angle at the outer portion of said thread being irreversible and the helix angle at the inner portion of the thread being reversible, a worm wheel formed with a plurality of teeth adapted to engage said thread during relative rotary movement, said thread and teeth being so formed with respect to each other that contact between the thread and teeth is effected on only the reversible portion of the thread when rotative effort is applied in one direction, and contact between the thread and teeth is effected on only the irreversible portion of the thread when rotative effort is applied in the opposite direction.

2. A worm and worm wheel gearing comprising a worm wheel formed with a thread having an irreversible helix angle adjacent its outer portion and a reversible helix angle adjacent its inner portion, and a worm wheel formed with a plurality of teeth adapted to engage said thread upon rotative movement, said thread and teeth being relatively formed with relieved portions adjacent their outer extremities on a common side, whereby the teeth will engage the outer portion or the inner portion only of the thread in accordance with the relative direction of rotation of the wheel with respect to its axis.

3. In a differential mechanism, a pair of axle sections each having a worm gear secured thereto, a drive shaft, a worm carrier, means connecting the carrier for operation by the drive shaft, worm means mounted on said carrier comprising a worm meshing with each worm gear, said worms being both formed with a similar thread, said thread being relieved on one side to provide a dedendum surface contact with the worm gear and the gear teeth being relieved to provide the contact of the addendum surface of the thread therewith on the opposite side of the thread, said addendum surfaces each having an irreversible helix angle and being adapted to engage the gear teeth to rotate their respective driven shafts, said gears when engaging the worms in a driving action being adapted to engage the dedendum surfaces thereof to cause rotation of their respective worms, and means gearing the worms to each other.

4. A power transmission device comprising a worm gear and a worm mounted in meshing engagement therewith, said worm being formed with a thread having one side partially relieved to provide a dedendum surface contact with the worm gear, the gear teeth being relieved on one side to provide for contact thereof with the addendum surface of the thread on the remaining side of the thread, said addendum surface having an irreversible helix angle adapted to engage the teeth of the gear in one direction of movement and lock therewith, and said dedendum surface having a reversible helix angle and adapted to engage the teeth of the gear in the remaining direction of movement to cause the worm to rotate on its axis.

5. In a differential mechanism, a pair of axle sections each having a worm gear secured thereto, a drive shaft, worm carrier, means connecting the carrier for operation by the drive shaft, worm means mounted on said carrier comprising a worm meshing with each worm gear, the teeth of each worm gear and the thread of its respective worm being mutually formed to provide contact of the teeth with a peripheral face of the thread when the worm is in forward driving engagement with the gear, and the contact of the teeth with a root face of the thread when the gear is in forward driving engagement with the worm, said peripheral face of the worm thread having a non-reversible helix angle and the root face of the thread having a reversible helix angle, and means gearing the worms to each other.

6. A power transmission device comprising a worm gear and a plurality of worms meshing therewith, a carrier for mounting said worms for planetary movement about said worm gear, a plurality of pairs of bearing supports on said carrier, each pair adapted to receive a worm therebetween, an axial conical bearing surface formed at one end of each worm, and a bearing adjustably mounted in each support and having a conical surface engaging in the conical bearing surface of a worm.

7. A power transmission device comprising a worm gear and a plurality of worms mounted in meshing engagement therewith, the teeth of said worm gear and the thread of each worm being mutually formed to provide contact of the teeth with a peripheral face of the thread in one direction of movement and the contact of the teeth with a root face of the thread in the opposite direction of movement, said peripheral face of the thread having a non-reversible helix angle and the root face of the thread having a reversible helix angle, means for mounting said worms in spaced relation about said gear, and adjustable bearing means for adjusting the axial position of each worm to obtain simultaneous contact of the worms with the gear.

8. A power transmission device comprising a worm gear and a worm mounted in meshing engagement therewith, the teeth of said worm gear and the thread of said worm being mutually formed to provide contact of the teeth with a peripheral face of the thread in one direction of movement and the contact of the teeth with a root face of the thread in the opposite direction of movement, said peripheral face of the thread having a non-reversible helix angle and the root face of the thread having a reversible helix angle.

PORTER S. MORGAN.